March 21, 1967 C. D. PAQUETTE 3,310,183
AUTOMOBILE FRAME STACKER
Filed July 8, 1964 7 Sheets-Sheet 1

INVENTOR.
CYRIL D. PAQUETTE
BY
*Burton & Parker*
ATTORNEYS

March 21, 1967 C. D. PAQUETTE 3,310,183
AUTOMOBILE FRAME STACKER
Filed July 8, 1964 7 Sheets-Sheet 2

FIG. 2

INVENTOR.
CYRIL D. PAQUETTE
BY
*Burton & Parker*
ATTORNEYS

March 21, 1967  C. D. PAQUETTE  3,310,183
AUTOMOBILE FRAME STACKER

Filed July 8, 1964  7 Sheets-Sheet 6

INVENTOR.
CYRIL D. PAQUETTE
BY
Burton & Parker
ATTORNEYS

United States Patent Office 3,310,183
Patented Mar. 21, 1967

3,310,183
AUTOMOBILE FRAME STACKER
Cyril D. Paquette, Grosse Pointe Park, Mich., assignor to Taylor & Gaskin, Inc., Detroit, Mich., a corporation of Michigan
Filed July 8, 1964, Ser. No. 381,139
3 Claims. (Cl. 214—6)

This invention relates generally to material handling devices, and more particularly to a system for handling automobile body frames.

The system disclosed herein is designed to receive successive frames being transported along a conveyor, discharge each frame from the conveyor, stack, the frames one on top of the other, and then transfer the stack to another location when the stack contains a predetermined number of frames, with the stack transfer being accomplished without interfering materially with the discharging and stacking of subsequent frames. The discharge, stacking and stack transfer operations are effected automatically in timed sequence, with the frames themselves serving to actuate the mechanism.

It is an object of the invention to provide a complete, integrated system for handling articles such as automobile frames completely automatically, which system includes means for discharging the articles from a moving conveyor, means for stacking successive frames one on top of the other, and transfer means for transferring a stack containing a predetermined number of frames to a remote location.

Another object is the provision of a system as described wherein the sequential operation of the discharge, stacking and transfer mechanisms is so coordinated and controlled that the operation of each does not materially affect nor impede the operation of the rest.

A further object is to provide an article discharge, stacking and stack transfer system including control means for controlling the sequential operation of the system wherein the actuation of the controls to initiate the various operations is accomplished by the articles, in this case frames, themselves, thereby insuring efficient and fast operation and also providing immediate interruption of operation in the event of improper article positioning so as to avoid damage to both articles and equipment.

Other objects, advantages and meritorious features of the invention will more fully appear from the following specification, claims and accompanying drawings, wherein:

The frame discharge, stacking and stack transfer system shown in the drawings comprises in general three basic mechanisms, the discharge mechanism 20, the stacker mechanism 22, and the transfer unit 24. A delivery conveyor 26 is powered by suitable means (not shown) to deliver successive frames F alongside the system, and at a predetermined point in its travel along conveyor 26, the discharge mechanism 20 pushes the frame F off conveyor 26 and into the stacking station on stacker 22. Upon receiving a frame properly positioned, the stacker lifts the frame vertically and deposits it upon a set of "dogs" (described in detail hereinafter), then the stacker retracts to accept a following frame from the pusher 20. Successive frames approaching on conveyor 26 are pushed by mechanism 20 into stacker 22 and are stacked by elevating the last frame underneath those already stacked, raising the stack slightly, and then lowering the stack onto the "dogs," until a stack containing a preselected number of frames has been formed. At this time, the transfer mechanism 24 operates to lift the stack and transfer it out of the stacker 22 and to a remote location.

Figure 1:
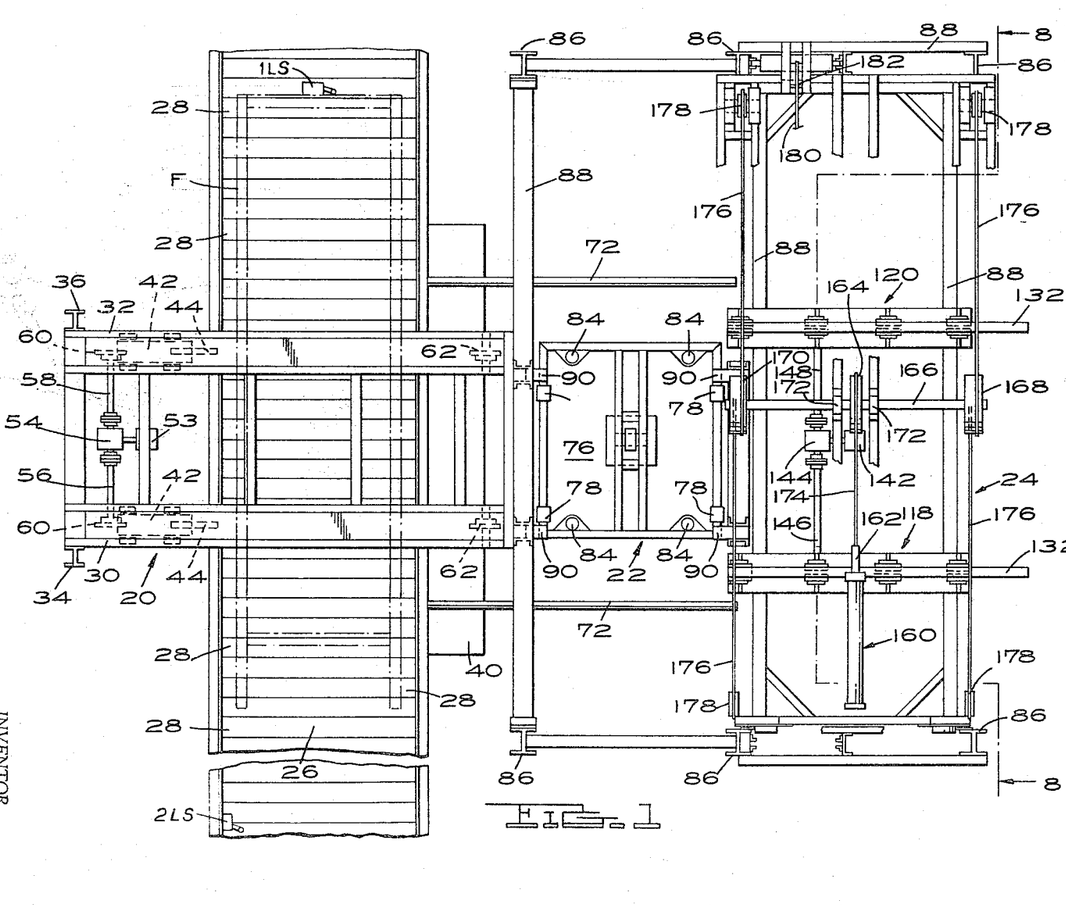
FIG. 1 is a top elevation of the frame discharge, stacking and stack transfer system embodying the invention.
Figure 2:
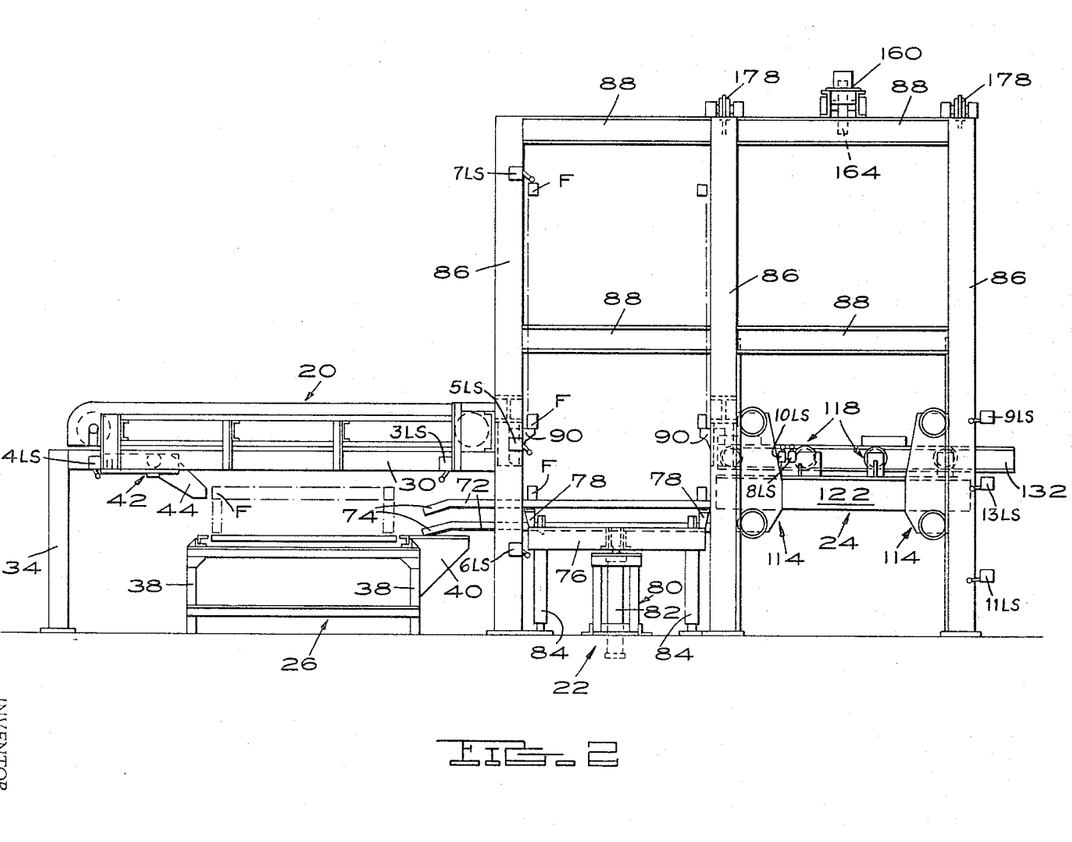
FIG. 2 is a side elevation of the system shown in FIG. 1.
Figure 4:
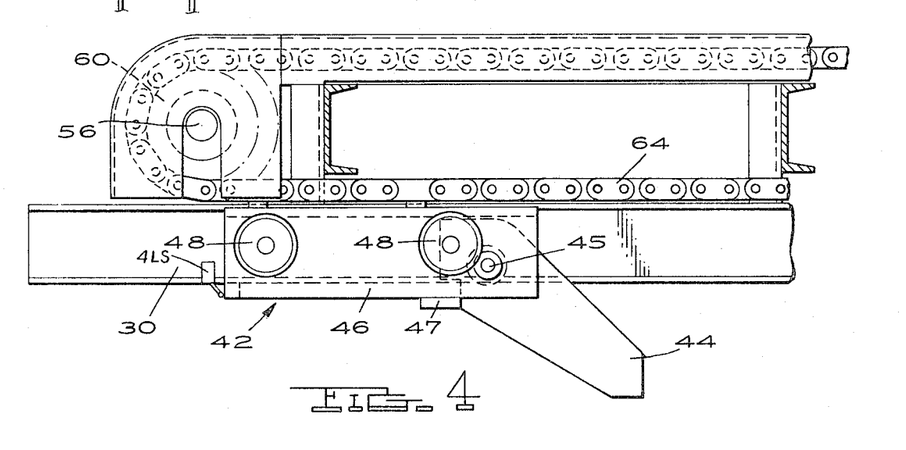
FIG. 4 is an enlarged side elevation of a portion of the frame discharge mechanism of FIG. 1 showing the frame pusher.

The conveyor 26 may be of any convenient form, and as shown in FIG. 1 may comprise spaced slats 28 upon which the frames rest. The discharge mechanism 20 comprises horizontal frame members 30 and 32 supported extending across conveyor 26 in spaced relation thereabove on vertical supports, as shown at 34 and 36. As shown in FIG. 2, conveyor 26 includes supporting legs 38 and also a stationary apron 40 at the side thereof adjacent the stacker 22 across which the frames are shifted in their movement from the conveyor into the stacker. Each member 30 and 32 carries one pusher assembly 42 (see FIGS. 4 and 5), which includes a pusher bar 44 pivotally mounted on a frame 46 having four rollers 48 which ride on opposed channels 50 and 52 secured as by welding to members 30 and 32. Push bar 44 is pivoted on a pin 45 supported in the frame 46, and is normally held in the position shown in FIG. 4 by a stop 47 secured as by welding to frame 46. The push bar may pivot counterclockwise as shown in FIG. 4, so that if a frame F enters the transfer area under the pusher while the latter is in its forward position, the pusher will pivot about pin 45 during retraction to slide across the frame on the conveyor, and then rotate back against the stop 47 to push the frame.

Figure 5:
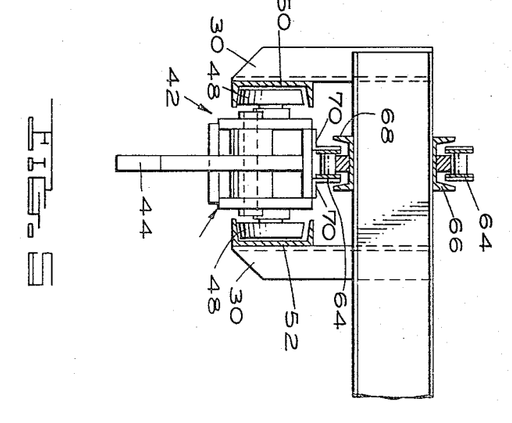
FIG. 5 is an end elevation of the pusher shown in FIG. 4.

Drive means 53, in the illustration a fluid pressure motor, is coupled to a gear drive 54, supported between members 30 and 32 and having drive shafts 56 and 58 coupled thereto with a sprocket 60 on the end of each shaft. Similar sprockets 62 are supported on idler shafts adjacent the stacker 22 (FIGS. 1 and 2) and a drive chain 64 is entrained over each pair of sprockets 60 and 62. The chain 64 is guided in its movement by guides 66 and 68 as shown in FIG. 5, and is integrally secured to the pusher frame 46 as by the L-shaped brackets 70. When a frame F being conveyed along conveyor 26 reaches a predetermined position adjacent pusher or discharge assembly 20, the leading edge of the frame strikes the switch arm of a limit switch, shown at 1LS in FIG. 1, closing the switch and actuating drive means 54 to move the pushers 42 across the conveyor 26 and discharge the frame F from the conveyor and into the stacker 22.

At the left-hand side of FIG. 2 there is shown a frame F ready to be contacted by the push bar 44 of pusher 42, and it can be seen that as the frame is pushed off conveyor 26, it will ride across apron 40 onto a plurality of horizontal bars 72 into the stacker 22, each bar having a downwardly inclined end portion 74 to facilitate sliding movement of the frame therealong. The stacker 22 includes an elevator having a table-like bed 76, at the four corners of which are mounted upstanding frame supporting ears 78. Table 76 is supported on a central structural base 80 and a fluid pressure cylinder assembly 82 is disposed therewithin to shift the elevator vertically. Telescopic guide members 84 near each corner of the table 76 serves to guide the table in its vertical movement.

Figure 6:
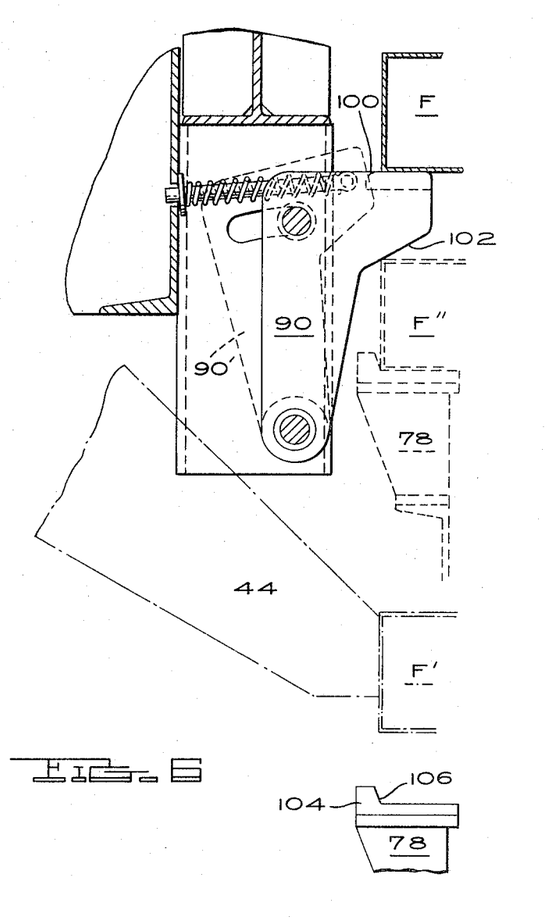
FIG. 6 is an enlarged vertical cross section of a portion of the stacking mechanism of FIG. 1 showing details of construction.

A structure of upright columns 86 and horizontal members 88 cooperate to form stack supporting means above the stacker 22 and also serve to support the stack transfer mechanism 24. Such are preferably of H beam construction as shown, and the structure is high enough to support a stack comprising a predetermined number of frames. Mounted on the members forming the stack supporting means are a plurality, in this case four, stack supports or "dogs" 90, spaced above table 76 and laterally spaced from the upright ears 78 on the table. Each dog 90, as shown in FIG. 6, is pivotally mounted on a horizontal axis 92, and is normally held in the frame-supporting position shown in solid outline in FIG. 6 by a coil spring 94. The dog is pivotally shiftable to the dotted outline position 94' of FIG. 6, and the limits of pivotal movement are determined by a pin 96 which projects through a slot 98 in the dog.

The dogs 90 are each of inverted L-shape, with the base of the L having a flat upper supporting face 100 and an inclined lower face 102. FIG. 6 shows the pusher bar at 44' in its extreme forward position, having pushed a frame, shown partially at F' into the stacker. As the frame reaches a proper position, it contacts the switch arm of limit switch 3LS, closing the switch to energize the controls which signal the pusher to retract and at the same time signal the elevator to rise. Each ear 78 on the elevator table has an upstanding projection 104 with an inclined face 106 so that when it engages the frame the latter is held against movement and retained in proper stacking position. The elevator moves upwardly beneath the frame and lifts it, striking the inclined face 102 of dogs 90, as shown at F'' in FIG. 6. As the frame strikes the dog, the latter pivots out of the way to its dotted position 90', allowing the frame to pass upwardly therebeyond, and then the dog pivots back to its normal position. When the frame F clears the dog 90, it strikes the switch arm of limit switch 5LS, signaling the elevator to go down, whereupon the frame F is deposited on dog 90.

Each frame F approaching along conveyor 26 has placed thereon spacer means or blocks (not shown). After the elevator of stacker 22 retracts, pusher 20 will again operate to push the next frame into the stacker 22, closing switch 3LS to retract pusher 42 and raise table 76. The spacer blocks on the frame being elevated engage the frame already resting on the dogs 90, lifting such frame off the dogs before the lower frame strikes the face 102 to pivot the dog out of the path of the ascending frame. Thus each successive frame is raised under the stack and the entire stack deposited on the dogs 90, and the pusher 20 and stacker 22 operate in timed sequence until a stack containing a predetermined number of frames is supported on the dogs 90, at which time the uppermost frame on the stack actuates limit switch 7LS, closure of which initiates operation of the stack transfer mechanism 24.

Figure 7:
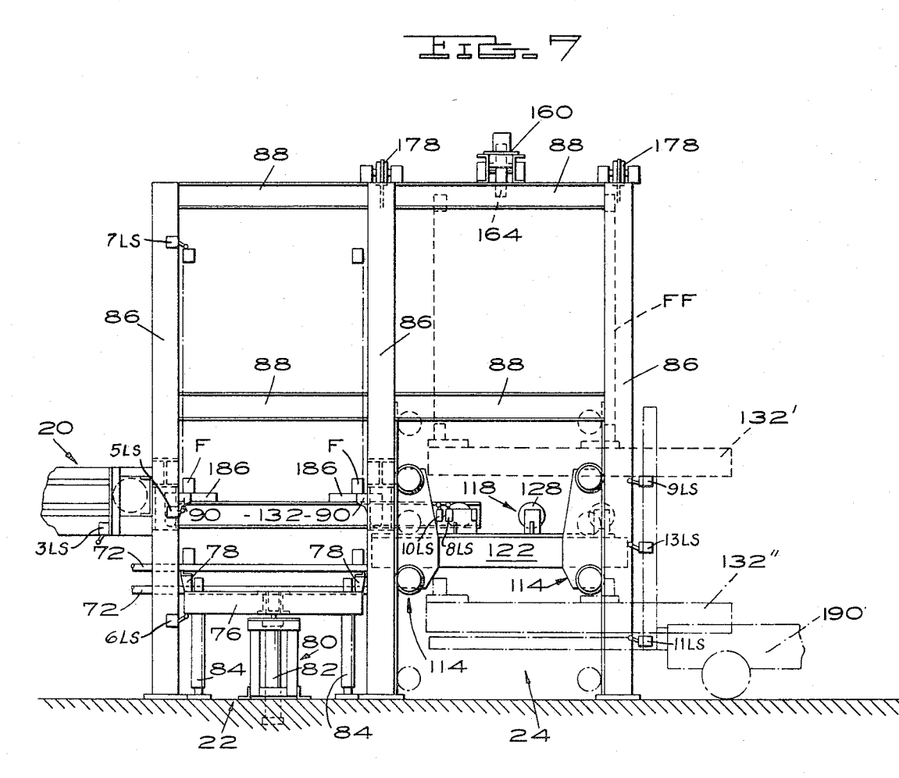
FIG. 7 is a side elevation of the stacking and stack transfer mechanisms similar to FIG. 2.
Figure 8:
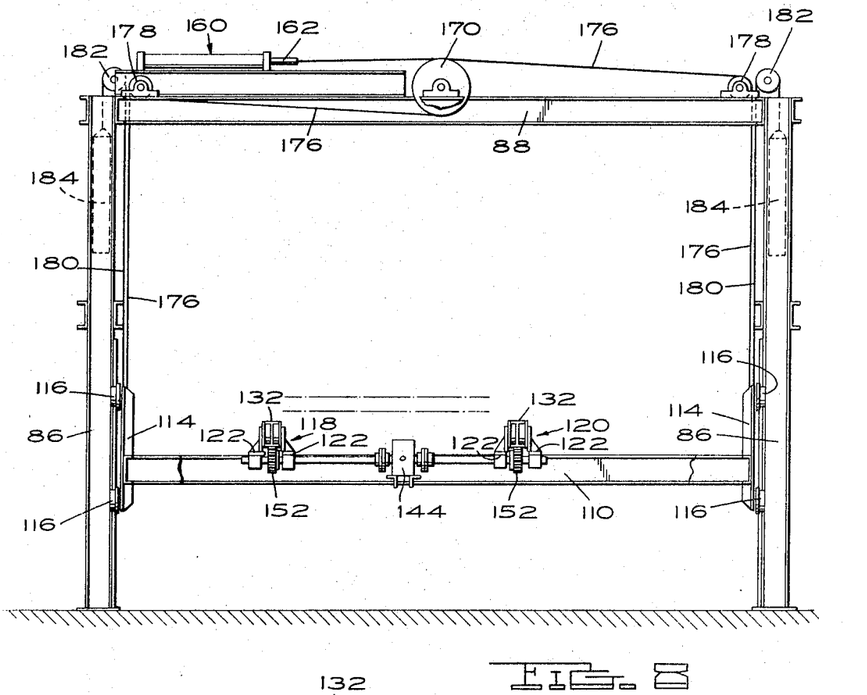
FIG. 8 is a vertical sectional view through the stack transfer mechanism taken along line 8—8 of FIG. 1.
Figure 9:
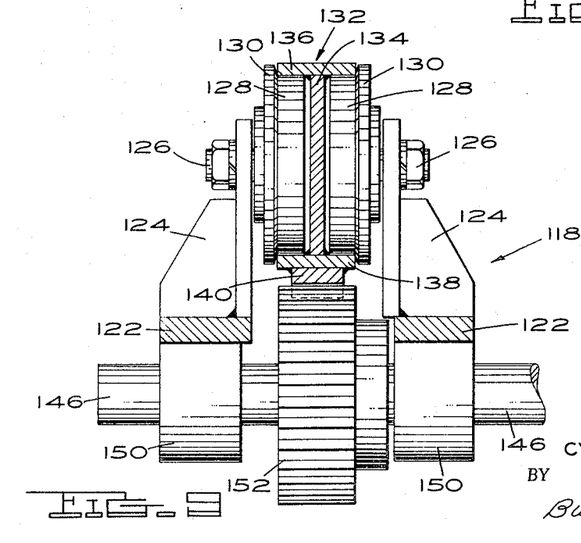
FIG. 9 is an enlarged cross section taken through one of the roller wheel assemblies showing details of construction.

The stack transfer mechanism 24 comprises a base made up of structural members 110 and 112 forming a generally rectangular shape having at each corner thereof trolley assemblies 114. The wheels 116 of each trolley assembly 114 engage and roll upon the vertical structural members 86, as shown in FIGS. 2, 7 and 8. Intermediate opposite ends of the members 110 are mounted two ram assemblies 118 and 120, each of which includes two pairs of beam-like supports 122 extending laterally therebetween. Secured to each beam 122 as by welding are a series of upright wheel supporting brackets 124, mounted in opposed pairs as shown in FIG. 9. Each bracket supports a stub axle 126 upon which is rotatably mounted a roller wheel 128. Each roller wheel is provided with a larger diameter portion 130 which serves to guide the member supported on the wheels. Referring to FIG. 2, each ram assembly 118 and 120 includes four pairs of roller wheels spaced along the beam 122.

Resting on the roller wheels 128 (FIGS. 8 and 9) is a ram beam 132 of substantially I-shape, which may be of welded construction comprising a web 134 and upper and lower flanges 136 and 138 respectively. The underside of the upper flange 136 of the beam 132 overhangs and rests upon the roller wheels 128 while the lower flange 138 lies spaced very slightly below the wheels. Secured to the underside of the beam lower flange 138 as by welding is a gear rack 140 extending the length of the beam. Intermediate the two beam assemblies 118 and 120, as shown in FIGS. 1 and 8, there is positioned motive means 142, in this case a fluid motor, coupled to a worm gear speed reducing drive 144. Projecting from opposite ends of the gear box 144 are drive shafts 146 and 148, journaled in suitable bearings 150 and each carrying a gear 152 meshing with a respective rack 140, as seen clearly in FIG. 9. Motor 142 is reversible, and operates to drive gears 152 in either direction to shift ram beams 132 back and forth on roller wheels 128.

Disposed atop the structure formed by members 86 and 88 (see FIGS. 1 and 8) is a fluid pressure cylinder assembly 160 having a reciprocable piston rod 162 projecting therefrom. Such operates to raise and lower the stack transfer means 24 through a pulley system including a main pulley 164 mounted centrally on a shaft 166 which carries at each end thereof a drum 168 and 170 respectively. Shaft 166 is journaled for rotation in bearings 172. A cable 174 is connected at one end to piston rod 162 and is fixedly secured at its opposite end to the periphery of pulley 164. Each trolley assembly 114 has a cable 176 fixed thereto, which cables extend upwardly from the trolleys and over suitable pulleys 178 at each corner of the structure and thence across the top of the framework and around the drums 168 and 170. Two cables are wound around each drum in opposite directions so that rotation of the drum in one direction will raise both trolleys suspended from the cables, and rotation in the opposite direction will lower the trolleys.

As seen in FIG. 8, extension of piston rod 162 permits rotation of drum 170 in a clockwise direction, which unwinds cables 176, lowering the trolleys 114, while retraction of piston rod 162 operates to raise the trolleys. There is also a secondary cable 180 connected to each trolley 114 and entrained over a pulley 182 and carrying at its opposite end a counterweight 184. Only one cable 180 and pulley is shown in FIG. 1, but it is to be understood that there are three more, one for each trolley 114. FIG. 8 shows more clearly the construction.

Referring first to FIG. 2 the ram beams 132 are shown in the retracted or "poised" position, at which they remain while a stack of frames is being formed in stacker 22. When the top frame F actuates switch 7LS, fluid motor 142 is operated to drive gears 152, shifting ram beams 132 to their extended position shown in solid outline in FIG. 7. Each beam 132 has pads 186 upon which the stack of frames F rests. As the beams 132 reach proper position under the stack, as shown in FIG. 7, limit switch 8LS is closed, signalling cylinder 160 to be actuated, retracting piston rod 162 to raise the entire ram assembly, lifting the stack of frames off the dogs 90. The stack is lifted only a few inches off the dogs, and the limit of upward movement is determined by the position of switch 9LS, closure of which signals motor 142 to operate in the reverse direction to retract ram beams 132 to the position shown in dotted outline at 132' in FIG. 7. The stack of frames is then at a position shown in dotted outline at FF in FIG. 7. Switch 10LS is now actuated signalling cylinder 160 to extend its piston rod 162, lowering the entire assecmbly past the "poised" position shown in FIG. 2 to the fully down or "unload" position shown at 132" in FIG. 7. As the assembly reaches this position, switch 11LS is actuated to stop the assembly.

Partially shown in FIG. 7 in phantom outline at 190 is a fork lift truck, which may be used to remove the stack of frames from the transfer mechanism 24 to another location. When the truck operator removes the stack of frames from the stacker 24, he pushes a conveniently located "reset" button or the like shown in FIG. 10, energizing the control to actuate cylinder 160, raising the ram assembly to its "poised" position as shown in FIG. 2 ready to transfer the next stack of frames. Switch 13LS is closed when the "poised" position is reached, stopping ascent of the assembly.

Operation

Figure 10:
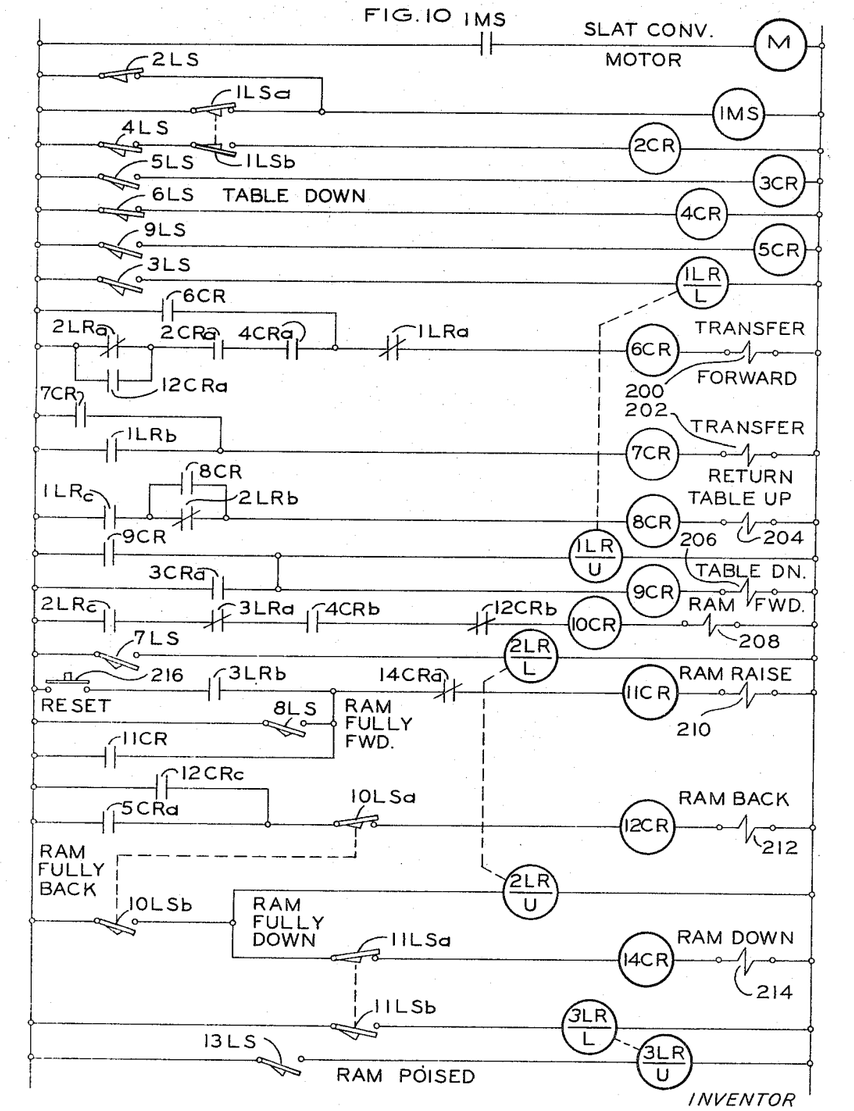
FIG. 10 is a schematic wiring diagram of the electrical control circuit for the system.

Referring to FIG. 10, which is a schematic diagram of the control circuit, the sequential operation of the system may be readily understood. Assuming the circuit is energized, which may be accomplished by suitable means not shown, the slat conveyor motor M runs when either of limit switches 2LS or 1LSa is closed, energizing relay 1MS and closing contacts 1MS. As a frame F proceeds along conveyor 26, it strikes the switch arm of 2LS, opening the switch, and unless 1LSa is open as described below, motor M keeps running and the frame proceeds to a position in front of discharge or transfer mechanism 20. Here the frame strikes 1LS, opening 1LSa and closing 1LSb. 4LS is closed by the pusher 42 being in retracted position so closure of 1LSb energizes relay 2CR, closing contacts.

To begin operation, stacking table 76 is down, closing 6LS to energize 4CR, closing contacts 4CRa. Neither of the latch 1LR or 2LR have been energized, so normally closed contacts 1LRa and 2LRa are closed, so closure of 2CRa energizes 6CR, which is locked in by its contacts 6CR, actuating Transfer Forward solenoid 200 to discharge frame F from conveyor 26' into the stacker 22. When the transfer reaches its fully forward position it strikes the switch arm of 3LS, closing it to energize latch relay 1LR, de-actuating solenoid 200 and actuating Transfer Return solenoid 202 through contacts 1LRa and 1LRb respectively, and thus returning the transfer to its retracted position. At the same time contacts 1LRc are closed, energizing relay 8CR and actuating Table Up solenoid 204 to raise the stacker table carrying the frame F upwardly past the dogs 90. At the height of its travel the table strikes the switch arm of 5LS, closing the switch to energize 3CR, which in turn operates to unlatch relay 1LR, opening contacts 1LRc; and to energize relay 9CR to actuate Table Down solenoid 206. The table shifts downwardly, depositing the frame on the dogs 90.

As can be seen from FIG. 10, forward movement of the transfer pusher 42 energizes latch relay 1LR, through closure of 3LS. As pusher 42 cannot again move forward until contacts 1LRa and 4CRa are closed, the table must move upwardly to energize 3CR, unlatching 1LR, and back down, to energize 4CR through 5LS before 6CR can be energized to actuate the Transfer Forward solenoid 200. Thus there is no possibility that pusher 42 can push another frame F into the stacker 22 until the stacking table has completed its cycle to deposit the preceding frame on the dogs 90.

Switch 2LS is spaced upstream from pusher 42 along conveyor 26, and it can be seen that if one frame F is on the conveyor ready to be transferred (opening 1LSa), and a following frame approaches, opening 2LS, that relay 1MS will be de-energized, opening 1MS and stopping slat conveyor 26. This ensures that never more than one frame F will be delivered to the discharge transfer 20 at a time, so there is no chance of collision of frames in the transfer area. The above sequence of operation is repeated to form a stack of frames in stacker 22 until the stack reaches a predetermined height, as determined by the position of limit switch 7LS.

When the stack is, say 10 frames high, the top frame on the stack strikes the switch arm of 7LS, closing the switch and energizing latch relay 2LR. This operates to close relay contacts 2LRc, and if the table 76 is down, contacts 4CRb will also be closed, and relay 10CR will be energized to actuate Ram Forward solenoid 208, shifting stack transfer ram beams 132 under the stack of frames. When the ram reaches its forward limit of travel, it contacts the switch arm of 8LS, closing the switch and thereby energizing 11CR to actuate Ram Raise solenoid 210, lifting the stack of frames off dogs 90 a few inches.

Upward travel of the ram this short distance causes the closure of limit switch 9LS, energizing relay 5CR to close contacts 5CRa, energizing 12CR and actuating Ram Back solenoid 212. Contacts 12CRb open to de-actuate Ram Forward solenoid 208 and the ram retracts. Energization of 2LR by closure of 7LS by a stack of frames has previously opened normally closed contacts 2LRa, preventing energization of 6CR to initiate movement of the transfer 20, and has also opened 2LRb to prevent actuation of the stacker mechanism 22 while the ram moves into the stacker area. Upon energization of 12CR to initiate rearward movement of the ram, relay contacts 12CRa are closed, enabling the next frame to be transferred from conveyor 26 to stacker 22, assuming the frame is in proper position for transfer.

When the ram reaches its fully retracted position carrying a stack of frames, switch 10LS is actuated, opening 10LSa and closing 10LSb. This energizes 14CR to actuate Ram Down solenoid 214, and also unlatches latch relay 2LR. The ram descends with the stack of frames thereon until it reaches the position shown at 132" in FIG. 7, where it actuates 11LS to open 11LSa and close 11LSb, energizing latch relay 3LR. This opens relay contacts 3LRa to prevent ram forward movement, and also closes contacts 3LRb to permit actuation of the ram raise solenoid upon closure of another switch as described below. The ram remains in this lower position until the stack of frames has been removed, as by a fork lift truck or the like. When the lift truck operator has removed the stack of frames, he closes the reset switch 216, which may be a pushbutton switch. Closure of switch 216 energizes relay 11CR, actuating Ram Raise solenoid 210, and the empty ram moves upwardly to its "poised" position, shown in FIG. 2, at which point it strikes the switch arm of 13LS, closing the switch to unlatch 3LR, thus opening contacts 3LRb to stop the ram at its "poised" position.

It can be seen from FIG. 10 that when limit switch 7LS is closed to initiate the transfer cycle of mechanism 24, latch relay 2LR is latched in, opening contacts 2LRa and 2LRb to prevent any actuation of discharge mechanism 20 or stacker mechanism 22 during a portion of the ram cycle. When the ram has lifted the stack of frames and is signalled to start its rearward movement by energization of relay 12CR, contacts 12CRa are closed, and another frame F may then be pushed into the stacker 22. Thus discharge pusher mechanism 20 may be actuated as soon as transfer unit 24 begins its movement out of the stacker area carrying a stack of frames. When the ram is fully retracted out of the stacker area, latch relay 2LR is unlatched by closure of 10LSb, reclosing contacts 2LRb, and permitting energization of relay 8CR to actuate the stacker 22.

Figure 3:
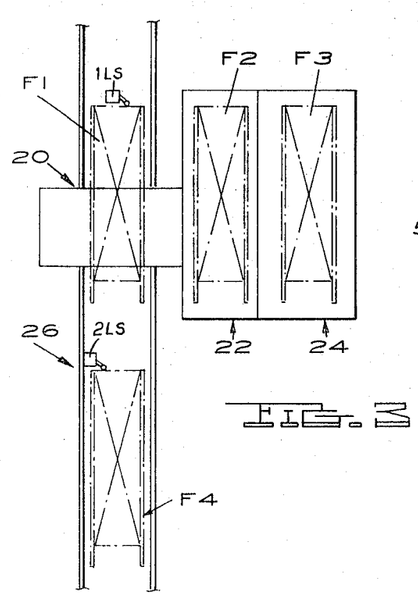
FIG. 3 is a schematic representation in top elevation showing the positions of several frames being handled by the system of FIG. 1.

In FIG. 3 there is schematically shown the discharge pusher 20, the stacker 22, stack transfer ram 24 and the infeed conveyor 26. The frame F1 is on the conveyor 26 ready to be pushed therefrom into stacker 22 to be stacked along with those frames F2 already stacked. At F3 there is shown a stack of frames in the transfer area 24 awaiting removal. Approaching the pusher 20 along conveyor 26 is the next frame to be handled, indicated at F4.

What is claimed is:
1. An automobile frame stacking apparatus for use with a conveyor delivering a succession of automobile frames in spaced apart, substantially horizontal positions, comprising, in combination: a conveyor unloader including a support extending transversely across the conveyor spaced thereabove and a frame-engaging pusher depending from said support for reciprocation therealong to transfer frames from the conveyor; frame elevator means including frame-supporting rails disposed in frame-receiving relation with said unloader adjacent the conveyor and a vertically shiftable frame elevator operable to elevate successive frames from said rails to a stack-holding position thereabove; stack-supporting means mounted spaced above said elevator means for receiving and supporting in a stack frames delivered thereto by said elevator including spaced apart dogs each pivotally mounted on a horizontal axis for limited rotational movement and having a substantially horizontal frame-supporting upper surface and an inclined lower surface for contact with a frame being elevated to pivot the dog; stack transfer means for transferring a stack of frames from said stack-supporting means to a stack storage station, said transfer means comprising a pair of vertically shiftable support beams each carrying a generally horizontal elongate ram beam mounted for longitudinal reciprocation on its support from a retracted position to an extended position beneath said stack; motive means coupled to said support beams to shift the same; motive means coupled to said ram beams to reciprocate the same; and control means connected to said conveyor unloader and to said frame elevator and to said stack transfer means operable to withhold operation of said elevator and initiate operation of said transfer means in response to a predetermined accumulation of frames in said stack, and operable to suspend operation of said unloader during operation of said elevator.

2. The invention as defined in claim 1 characterized in that said conveyor unloader pusher comprises at least one trolley member reciprocable along said support and a frame-engaging pusher finger pivotally mounted on said trolley for frame-engaging transfer movement when shifted in one direction and frame-bypassing pivotal movement when shifted in the opposite direction.

3. The invention as defined in claim 1 characterized in that each of said dogs is of inverted L shape having a generally vertical leg and a generally horizontal base, pivotally mounted on said horizontal axis adjacent the lower end of said leg, and includes spring means yieldably urging the dog to its frame-supporting position.

References Cited by the Examiner
UNITED STATES PATENTS
| | | | |
|---|---|---|---|
| 2,997,187 | 8/1961 | Burt | 214—6 |
| 3,039,625 | 6/1962 | Bruce | 214—6 |
| 3,057,486 | 10/1962 | Moulthrop et al. | 214—6 |

FOREIGN PATENTS
| | | |
|---|---|---|
| 100,841 | 11/1962 | Norway. |

GERALD M. FORLENZA, *Primary Examiner.*

J. E. OLDS, *Assistant Examiner.*